United States Patent
Takiguchi et al.

(10) Patent No.: US 11,310,683 B2
(45) Date of Patent: Apr. 19, 2022

(54) MOBILE TERMINAL TESTING APPARATUS AND METHOD OF CONTROLLING OUT-OF-SERVICE TEST OF THE SAME

(71) Applicant: ANRITSU CORPORATION, Kanagawa (JP)

(72) Inventors: Nami Takiguchi, Kanagawa (JP); Tsuyoshi Sato, Kanagawa (JP); Kenji Fujita, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 27 days.

(21) Appl. No.: 17/116,606

(22) Filed: Dec. 9, 2020

(65) Prior Publication Data

US 2021/0227408 A1     Jul. 22, 2021

(30) Foreign Application Priority Data

Jan. 17, 2020   (JP) .............................. JP2020-006228

(51) Int. Cl.
  *H04W 24/00*    (2009.01)
  *H04W 24/06*    (2009.01)
  *H04W 68/00*    (2009.01)
  *H04W 4/20*     (2018.01)

(52) U.S. Cl.
  CPC ............. *H04W 24/06* (2013.01); *H04W 4/20* (2013.01); *H04W 68/005* (2013.01)

(58) Field of Classification Search
  None
  See application file for complete search history.

(56) References Cited

U.S. PATENT DOCUMENTS

2010/0120371 A1    5/2010   Sato et al.
2013/0084853 A1*   4/2013   Mineda ................. H04W 24/06
                                                   455/425

FOREIGN PATENT DOCUMENTS

JP       2010-136341 A     6/2010

* cited by examiner

*Primary Examiner* — Suhail Khan
(74) *Attorney, Agent, or Firm* — Pearne & Gordon LLP

(57) ABSTRACT

Provided is a mobile terminal testing apparatus capable of executing a test for putting any pseudo base station out of service during state transition, such as during handover or during position registration. A mobile terminal testing apparatus includes a plurality of pseudo base station units 18-1, 18-2, and 18-3 that simulate a plurality of base stations, and a scenario processing unit 17 that controls the pseudo base station units 18-1, 18-2, and 18-3 in compliance with a set scenario to execute a test. The scenario processing unit 17 puts the pseudo base station units 18-1, 18-2, and 18-3 set as a base station executing an out-of-service test out of service in a case where a message set as a message to execute the out-of-service test is transmitted from the pseudo base station units 18-1, 18-2, and 18-3 set as a base station transmitting the message to execute the out-of-service test.

6 Claims, 9 Drawing Sheets

MOBILE TERMINAL TESTING APPARATUS AND METHOD OF CONTROLLING OUT-OF-SERVICE TEST OF THE SAME

TECHNICAL FIELD

The present invention relates to a mobile terminal testing apparatus that executes a test on a mobile terminal.

BACKGROUND ART

In a case where a mobile terminal, such as a mobile phone or a data communication terminal, has been developed, there is a need to test whether or not the developed mobile terminal can normally perform communication. For this reason, a mobile terminal that is a test target is connected to a testing apparatus that operates as a pseudo base station simulating a function of an actual base station, communication is performed between the testing apparatus and the mobile terminal, and a test for confirming content of the communication is executed.

Patent Document 1 describes that a plurality of pseudo base station units are provided, and a test of handover or a test of position registration is executed using a plurality of pseudo base station units, and describes that, in the test of position registration, a situation in which the mobile terminal is moved from an out-of-service area where radio waves of the base station do not reach to an in-service area where the radio waves reach can be simulated.

RELATED ART DOCUMENT

Patent Document

[Patent Document 1] JP-A-2010-136341

DISCLOSURE OF THE INVENTION

Problem that the Invention is to Solve

However, in such a mobile terminal testing apparatus, while an out-of-service test in a steady state can be executed like the test of position registration in a case where the mobile terminal is moved from the out-of-service area to the in-service area, a test for putting any pseudo base station out of service during handover or during processing of position registration could not be executed.

Accordingly, an object of the present invention is to provide a mobile terminal testing apparatus capable of executing a test for putting any pseudo base station out of service during state transition, such as during handover or during position registration.

Means for Solving the Problem

A mobile terminal testing apparatus of the present invention is a mobile terminal testing apparatus that simulates a plurality of base stations of mobile communication to test a mobile terminal, and includes a plurality of pseudo base station units that simulate the base stations, and a scenario processing unit that controls the pseudo base station units in compliance with a set scenario to execute a test, in which the scenario processing unit puts at least one pseudo base station unit, which is set as a base station executing an out-of-service test, out of service in a case where a message set as a message to execute the out-of-service test is transmitted from one pseudo base station unit set as a base station transmitting the message to execute the out-of-service test.

With this configuration, in a case where the message set as the message to execute the out-of-service test is transmitted from the one pseudo base station unit set as the base station transmitting the message to execute the out-of-service test, the at least one pseudo base station unit set as the base station executing the out-of-service test is put out of service. For this reason, it is possible to execute a test for putting any pseudo base station out of service during state transition, such as during handover or during position registration.

In the mobile terminal testing apparatus of the present invention, the scenario processing unit puts the at least one pseudo base station unit out of service set as the base station executing the out-of-service test after a set time elapses in a case where the message set as the message to execute the out-of-service test is transmitted from the one pseudo base station unit set as the base station transmitting the message to execute the out-of-service test.

With this configuration, in a case where the message set as the message to execute the out-of-service test is transmitted from the one pseudo base station unit set as the base station transmitting the message to execute the out-of-service test, the at least one pseudo base station unit set as the base station executing the out-of-service test is put out of service after the set time elapses. For this reason, it is possible to increase states of an executable test by adjusting the timing at which the pseudo base station is put out of service.

In the mobile terminal testing apparatus of the present invention, the scenario processing unit puts a plurality of the pseudo base station units set as the base station executing the out-of-service test out of service after the set time elapses, respectively, in a case where the message set as the message to execute the out-of-service test is transmitted from the one pseudo base station unit set as the base station transmitting the message to execute the out-of-service test.

With this configuration, in a case where the message set as the message to execute the out-of-service test is transmitted from the one pseudo base station unit set as the base station transmitting the message to execute the out-of-service test, a plurality of the pseudo base station units set as the base station executing the out-of-service test are put out of service after the set time elapses, respectively. For this reason, it is possible to increase states of an executable test by changing the timings at which the plurality of pseudo base station units are put out of service.

A method of controlling an out-of-service test of mobile terminal testing apparatus of the present invention is a method of controlling an out-of-service test of a mobile terminal testing apparatus that includes a plurality of pseudo base station units simulating a plurality of base stations of mobile communication and simulates the base stations to test a mobile terminal, and includes a step of determining whether or not a message set as a message to execute the out-of-service test is transmitted from one pseudo base station unit set as a base station transmitting the message to execute the out-of-service test, and a step of putting at least one pseudo base station unit set as a base station executing the out-of-service test out of service in a case where the message set as the message to execute the out-of-service test is transmitted from the pseudo base station unit set as the base station transmitting the message to execute the out-of-service test.

With this configuration, in a case where the message set as the message to execute the out-of-service test is transmitted from the one pseudo base station unit set as the base station transmitting the message to execute the out-of-service test, the at least one pseudo base station unit set as a base station executing the out-of-service test is put out of service. For this reason, it is possible to execute a test for putting any pseudo base station out of service during state transition, such as during handover or during position registration.

In the method of the present invention, the step of putting the at least one pseudo base station unit set as the base station executing the out-of-service test out of service is a step of putting the at least one pseudo base station unit set as the base station executing the out-of-service test out of service after a set time elapses in a case where the message set as the message to execute the out-of-service test is transmitted from the one pseudo base station unit set as the base station transmitting the message to execute the out-of-service test.

In the method of the present invention, the step of putting the at least one pseudo base station unit set as the base station executing the out-of-service test out of service is a step of putting a plurality of the pseudo base station units set as the base station executing the out-of-service test out of service after the set time elapses, respectively, in a case where the message set as the message to execute the out-of-service test is transmitted from the one pseudo base station unit set as the base station transmitting the message to execute the out-of-service test.

Advantage of the Invention

According to the present invention, it is possible to provide a mobile terminal testing apparatus capable of executing a test for putting any pseudo base station out of service during state transition, such as during handover or during position registration.

BEST MODE FOR CARRYING OUT THE INVENTION

Figure 1:
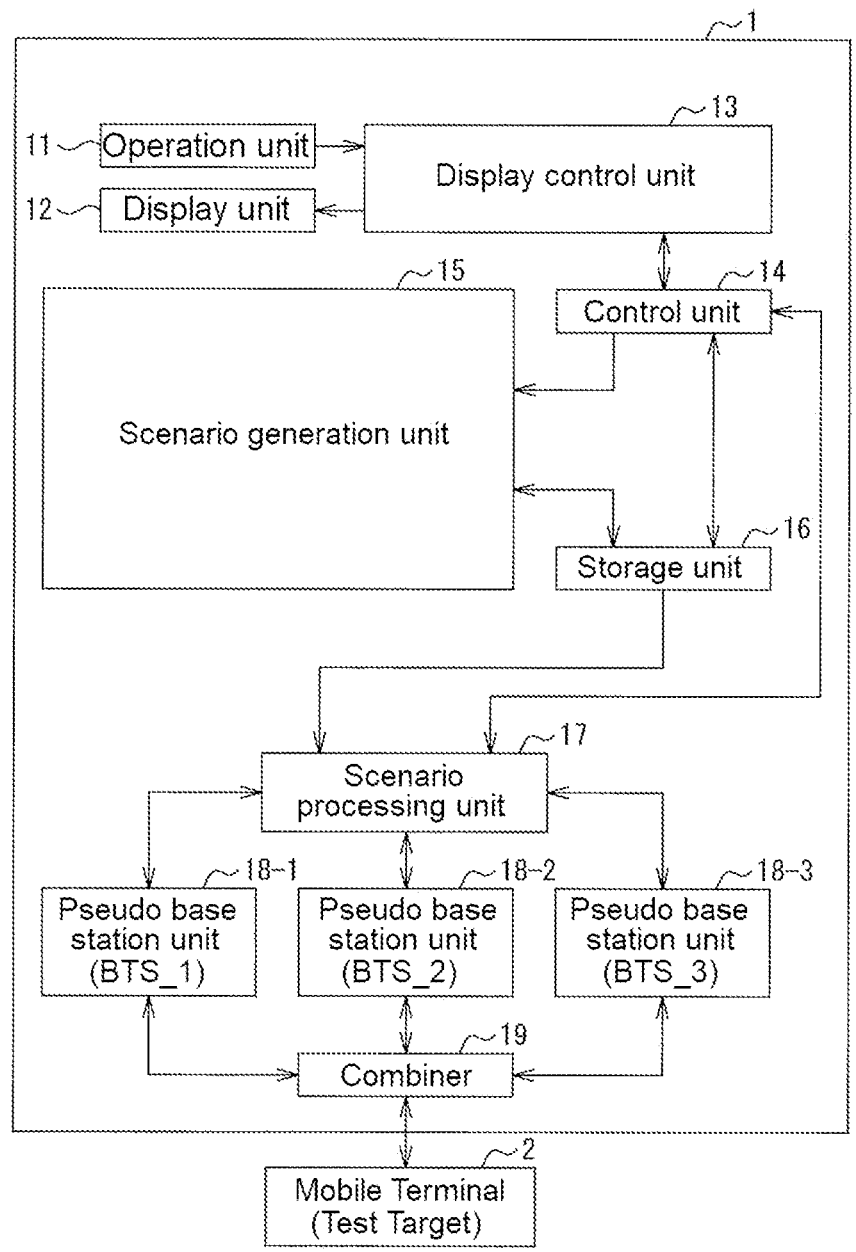
FIG. 1 is a block diagram of a mobile terminal testing apparatus according to an embodiment of the present invention.

Hereinafter, a mobile terminal testing apparatus according to an embodiment of the present invention will be described in detail referring to the drawings.

In FIG. 1, a mobile terminal testing apparatus 1 according to the embodiment of the present invention is configured to transmit and receive radio signals to and from a mobile terminal 2 in a wired manner through a coaxial cable or the like as a pseudo base station.

The mobile terminal testing apparatus 1 includes an operation unit 11, a display unit 12, a display control unit 13, a control unit 14, a scenario generation unit 15, a storage unit 16, a scenario processing unit 17, a pseudo base station unit 18-1, a pseudo base station unit 18-2, a pseudo base station unit 18-3, and a combiner 19.

The operation unit 11 is configured of input devices, such as a keyboard, a mouse, and a touch panel, and outputs information and the like necessary for scenario generation input through an operation to the display control unit 13. The display unit 12 is configured of an image display device, such as a liquid crystal display, and displays an image for inputting information necessary for scenario generation, an image indicating a state under test, or the like.

The display control unit 13 generates and displays an image to be displayed on the display unit 12, and is configured to perform control of image generation and display according to an instruction from the control unit 14. Furthermore, the display control unit 13 changes the display on the display unit 12 based on information input to the operation unit 11 or transmits information input to the operation unit 11 to the control unit 14.

The control unit 14 causes the display control unit 13 to display a scenario creation screen on the display unit 12 to allow an input of information necessary for scenario generation or transmits information input to the operation unit 11 on the scenario creation screen to the scenario generation unit 15 to generate a scenario according to an instruction input to the operation unit 11. Furthermore, the control unit 14 transmits an instruction to the scenario processing unit 17 such that a test is executed based on a scenario stored in the storage unit 16 or causes the display control unit 13 to display a state under test, or the like on the display unit 12 based on information regarding a state of each of the pseudo base station units 18-1, 18-2, and 18-3, a state of communication with the mobile terminal 2, or the like transmitted from the scenario processing unit 17 according to an instruction input to the operation unit 11.

The scenario generation unit 15 generates a scenario for testing the mobile terminal 2 based on information for scenario generation transmitted from the control unit 14. An operation of each of the pseudo base station units 18-1, 18-2, and 18-3 or a communication sequence with the mobile terminal 2 is set in the scenario.

The storage unit 16 is configured of a hard disk device or a flash memory, and stores various scenarios generated by the scenario generation unit 15.

The scenario processing unit 17 reads the scenario stored in the storage unit 16 and causes the pseudo base station units 18-1, 18-2, and 18-3 to transmit notification information or to execute a communication sequence with the mobile terminal 2 based on the scenario according to an instruction from the control unit 14.

The pseudo base station unit 18-1, the pseudo base station unit 18-2, and the pseudo base station unit 18-3 transmit and receive radio signals to and from the mobile terminal 2 according to an instruction from the scenario processing unit 17.

The combiner 19 combines radio signals transmitted from the pseudo base station units 18-1, 18-2, and 18-3 and transmits a resultant signal to the mobile terminal 2. Furthermore, the combiner 19 transmits a signal received from the mobile terminal 2 to each of the pseudo base station units 18-1, 18-2, and 18-3.

Here, the mobile terminal testing apparatus 1 is configured of a computer device (not shown) provided with a communication module for performing communication with the mobile terminal 2. The computer device has a central processing unit (CPU), a read only memory (ROM), a random access memory (RAM), a hard disk device, an input-output port, and a touch panel.

A program that causes the computer device to function as the mobile terminal testing apparatus 1 is stored in the ROM and the hard disk device of the computer device. That is, the computer device functions as the mobile terminal testing apparatus 1 by the CPU executing the program stored in the ROM using the RAM as a work area.

In this way, in the embodiment, the storage unit 16 is configured of the RAM or the hard disk device, the display control unit 13, the control unit 14, the scenario generation unit 15, and the scenario processing unit 17 are configured of the CPU, and the pseudo base station units 18-1, 18-2, and 18-3 are configured of the communication module.

In the mobile terminal testing apparatus 1 having such a configuration, in a case where a test on the mobile terminal 2 is executed, first, a scenario for use in the test is created by a user. In a case where a scenario creation function is selected by a user's operation on the operation unit 11, for example, the control unit 14 displays the scenario creation screen on the display unit 12 to allow setting of information of base stations simulated by the pseudo base station units 18-1, 18-2, and 18-3, a sequence to be executed, and the like.

The user sets various kinds of information in conformity with an intended test for each base station. The control unit 14 transmits the set information to the scenario generation unit 15 to generate a scenario of the pseudo base station. The scenario generation unit 15 generates notification information, sequence information, and the like based on information received from the control unit 14 and stores the notification information, the sequence information, and the like as the scenario of the pseudo base station in the storage unit 16 in association with identification information.

Furthermore, the mobile terminal testing apparatus 1 of the embodiment can put the set pseudo base station units 18-1, 18-2, and 18-3 out of service when a set message is transmitted from the set pseudo base station units 18-1, 18-2, and 18-3 during state transition, such as handover or position registration. The mobile terminal testing apparatus 1 puts the pseudo base station units 18-1, 18-2, and 18-3 out of service, for example, by powering down transmission signals of the pseudo base station units 18-1, 18-2, and 18-3.

Figure 2:
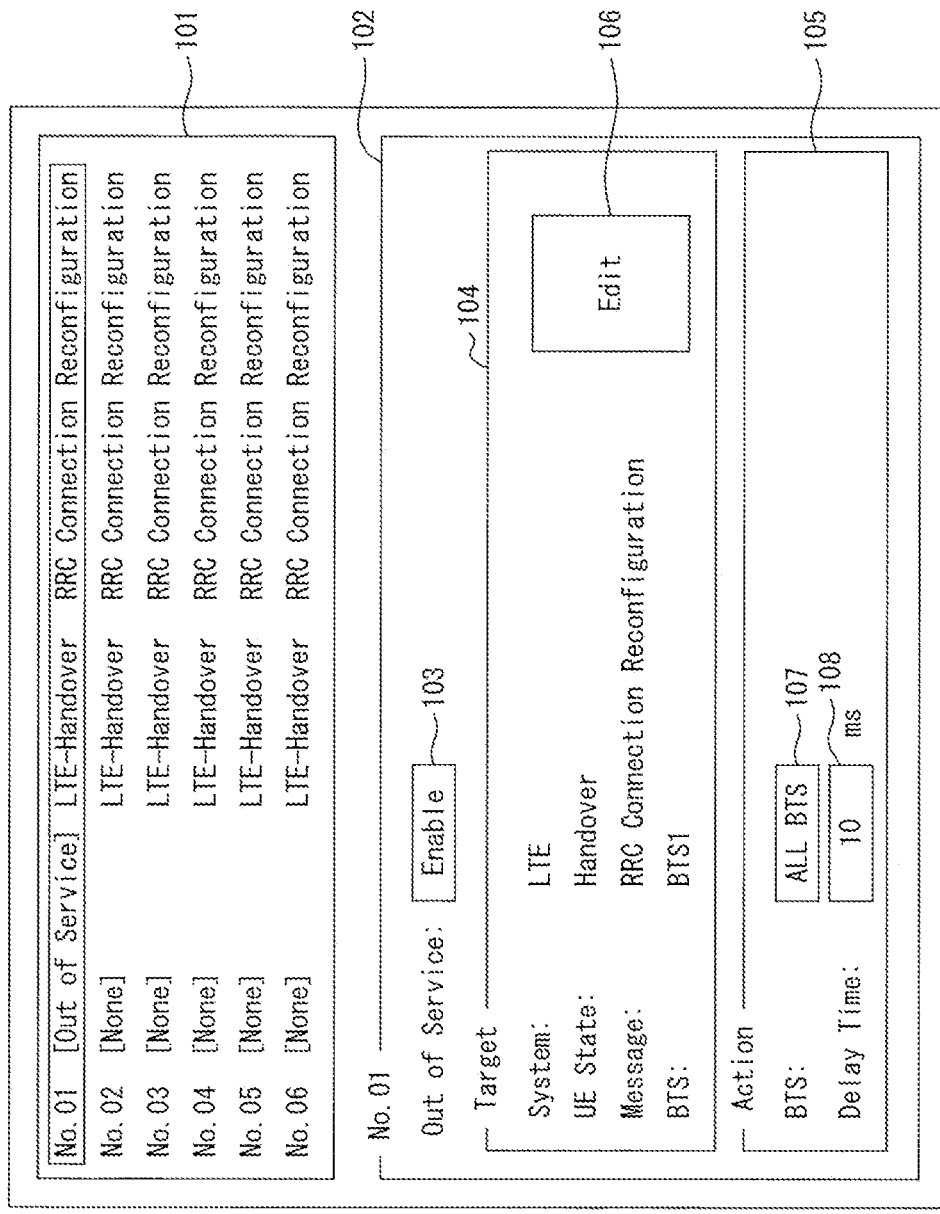
FIG. 2 is a diagram showing an example of an out-of-service test setting screen of the mobile terminal testing apparatus according to the embodiment of the present invention.

In a case where a setting of an out-of-service test is selected by a user's operation on the operation unit 11, for example, the control unit 14 displays an out-of-service test setting screen shown in FIG. 2 on the display unit 12 to allow the setting of the out-of-service test.

In FIG. 2, a setting list display portion 101 displays a list of the setting of the out-of-service test. In an example of FIG. 2, while the setting of the out-of-service test is performed in "No. 01", the setting of the out-of-service test is not performed in other rows (the display of the second column is "[None]").

In a case where one row of the setting list display portion 101 is selected by mouse click or the like, setting content of the row is displayed in the setting content display portion 102.

An execution setting portion 103 is for setting whether or not to execute the out-of-service test. "Enable" means to execute the out-of-service test, and "Disable" means not to execute the out-of-service test.

A target message setting portion 104 is for setting a state (UE State) of the mobile terminal 2 on which the out-of-service test is executed, a message (Message) to execute the out-of-service test, and the like.

An operation setting portion 105 is for setting parameters in a case where the out-of-service test is executed. An out-of-service base station setting portion 107 is for setting base stations (pseudo base station units 18-1, 18-2, or 18-3) that executes the out-of-service test. In the drawing, a case where all base stations are put out of service is shown.

A timer setting portion 108 is for setting a time until the out-of-service test is executed. In the drawing, a case where base stations are put out of service after waiting for 10 ms from the transmission of the set message is shown.

Figure 3:
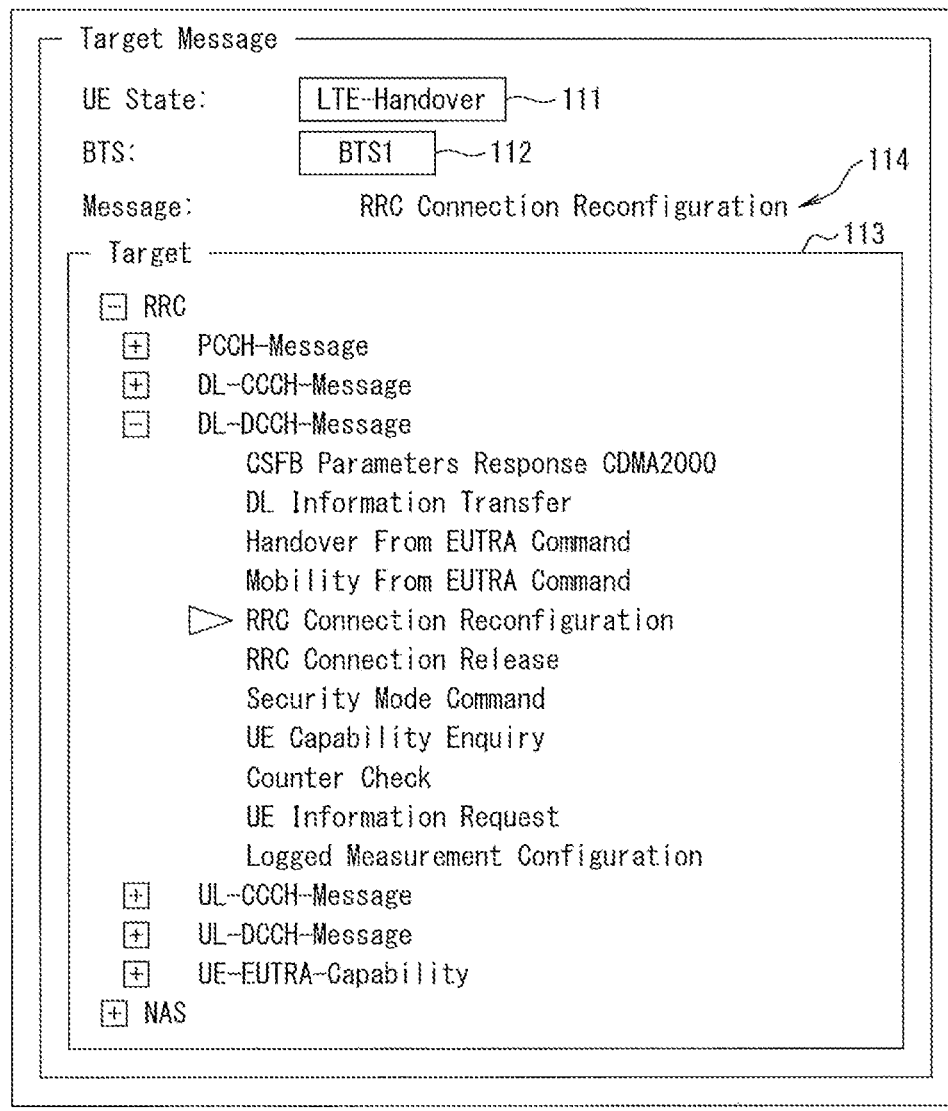
FIG. 3 is a diagram showing an example of a target message setting screen of the mobile terminal testing apparatus according to the embodiment of the present invention.

In a case where an edit button 106 of the target message setting portion 104 is selected by mouse click or the like, a target message setting screen shown in FIG. 3 is displayed.

In FIG. 3, a state setting portion 111 is for setting a state (UE State) of the mobile terminal 2 on which an out-of-service test is executed. Besides, a system name, such as Long Term Evolution (LTE) or Wideband-Code Division Multiple Access (W-CDMA), is also set.

UE State includes Power Off, Registration, Detach, Idle, Origination, Termination, Communication, UE Release, NW Release, Handover, and Updating.

Power Off is a state in which the mobile terminal 2 is powered off or is in a flight mode. Registration is a state in which the mobile terminal 2 is executing position registration processing. Detach is a state in which processing of completely releasing connection between the mobile terminal 2 and a network is being executed. This state is a state in which the mobile terminal 2 is being switched from power-on to power-off.

Idle is a state in which position registration ends and the mobile terminal 2 is waiting for an outgoing call or an incoming call. Origination is a state in which, when there is data desired to be sent from the mobile terminal 2 or a voice call is desired to be made, outgoing call processing is being executed to the network.

Termination is a state in which, when a voice call is received or data is sent from another terminal, notification is given from the network side to the mobile terminal 2. This state is a state in which the mobile terminal 2 is executing incoming call processing.

Communication is a state in which the mobile terminal 2 is performing data communication or voice communication with a connection destination. UE Release is a state in which data communication or a voice call ends and release processing from the mobile terminal 2 is being executed. NW Release is a state in which data communication or a voice call ends and release processing from the network side is being executed.

Handover is a state in which the mobile terminal 2 is moving between base stations (a state in which connection switching from a base station in communication to another base station is being performed). Updating is a state in which transition is being made to a state in which packet communication is suppressed little in order to suppress power consumption in the mobile terminal 2 during packet communication (a case where a state in which packet communication is suppressed little is returned to a normal packet communication state also becomes the Updating state).

A transmission base station setting portion 112 is for setting the pseudo base station unit 18-1, 18-2, or 18-3 to which a message to execute the out-of-service test is transmitted.

A message selection portion 113 is for selecting a message to execute the out-of-service test. For example, the message selection portion 113 displays a list of messages and makes selection of a message to execute the out-of-service test among the list of messages by mouse click or the like. In the drawing, "RRC Connection Reconfiguration" with a triangle mark attached to a left end is selected.

The message selected in the message selection portion 113 is displayed in a message display portion 114. Only a message related to the state (UE State) of the mobile terminal 2 set in the state setting portion 111 may be displayed and made to be selected.

After such a setting of the out-of-service test is performed, the user connects the mobile terminal testing apparatus 1 and the mobile terminal 2 in a wired manner, and selects a scenario of the pseudo base station to be used.

The control unit 14 notifies the scenario processing unit 17 of the identification information of the selected scenario of the pseudo base station and causes the scenario processing unit 17 to execute the scenario.

The scenario processing unit 17 reads the scenario associated with the notified identification information from the storage unit 16, notifies the pseudo base station units 18-1, 18-2, and 18-3 of content of notification information, transmission information in the position registration processing, and the like based on the read scenario, and causes the pseudo base station units 18-1, 18-2, and 18-3 to start the operation as pseudo base stations.

In a case where execution of the scenario starts, the scenario processing unit 17 notifies the control unit 14 of the states of the pseudo base station units 18-1, 18-2, and 18-3 that execute the scenario.

In a case where information regarding the states of the pseudo base station units 18-1, 18-2, and 18-3 is received from the scenario processing unit 17, the control unit 14 causes the display control unit 13 to display the states of the pseudo base station units 18-1, 18-2, and 18-3, a connection state of the mobile terminal 2, and the like on the display unit 12.

After the scenario of the pseudo base station to be used is selected, the user power on the mobile terminal 2 to cause the mobile terminal 2 to perform position registration, and it is confirmed on the mobile terminal testing apparatus 1 side whether or not the position registration is normally performed.

Thereafter, in a case where the execution of the test is selected by an operation on the operation unit 11, the scenario processing unit 17 starts the execution of the sequence set in the scenario.

Figure 4:
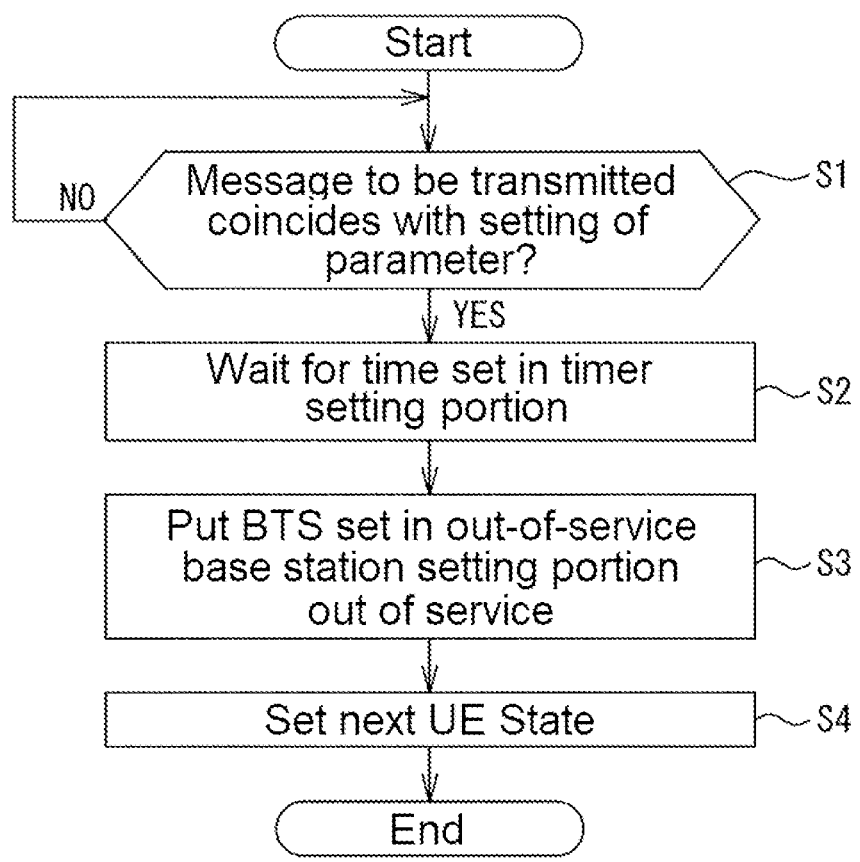
FIG. 4 is a flowchart showing a procedure of out-of-service test processing of the mobile terminal testing apparatus according to the embodiment of the present invention.

In a case where the execution of the scenario of the pseudo base station is started, and in a case where the setting of the out-of-service test is performed, the scenario processing unit 17 executes out-of-service test processing shown in FIG. 4.

First, in Step S1, the scenario processing unit 17 determines whether or not a message to be transmitted from a base station set as a parameter of the out-of-service test coincides with a set message. In a case where determination is made that the message to be transmitted does not coincide with the set message, the scenario processing unit 17 repeats the processing of Step S1.

In a case where determination is made that the message to be transmitted coincides with the set message, the scenario processing unit 17 executes processing of Step S2.

In Step S2, the scenario processing unit 17 waits for the processing for the time set in the timer setting portion 108. After executing the processing of Step S2, the scenario processing unit 17 executes processing of Step S3.

In Step S3, the scenario processing unit 17 puts the base stations set in the out-of-service base station setting portion 107 out of service. After executing the processing of Step S3, the scenario processing unit 17 executes processing of Step S4.

In Step S4, the scenario processing unit 17 sets next UE State. Next UE State is Idle in a case where the base station to which the mobile terminal 2 is connected coincides with an out-of-service target base station, and is not forcibly decided and is deferred to the last scenario in a case where the base station to which the mobile terminal 2 is connected does not coincide with the out-of-service target base station. After executing the processing of Step S4, the scenario processing unit 17 ends the out-of-service test processing.

The control unit 14 stores information regarding the transmission and reception messages under test as a log in the storage unit 16 and displays the information on the display unit 12 according to a request from the user.

An operation example by the mobile terminal testing apparatus according to the embodiment configured as above will be described referring to FIGS. 5 to 9.

Figure 5:
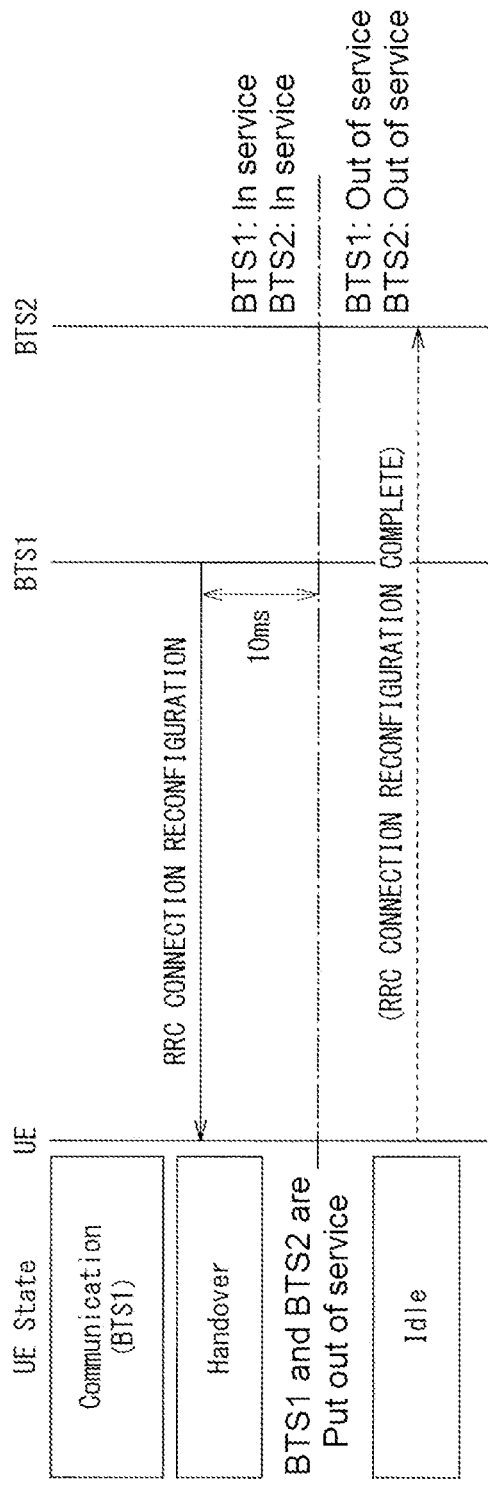
FIG. 5 is a sequence diagram showing a first operation example of the mobile terminal testing apparatus according to the embodiment of the present invention.

FIG. 5 shows, as a first operation example, a case where the state (UE State) of the mobile terminal 2, on which the out-of-service test is executed, is "Handover", a message to execute the out-of-service test is "RRC CONNECTION RECONFIGURATION", a base station that transmits the message is "BTS1", a waiting time until a base station is put out of service is "10 ms", and base stations that are put out of service are "all base stations".

As shown in FIG. 5, in a case where RRC CONNECTION RECONFIGURATION is transmitted from BTS1, UE State becomes Handover, and all base stations are put out of service after waiting for 10 ms. UE State becomes Idle since connected BTS1 is put out of service.

Figure 6:
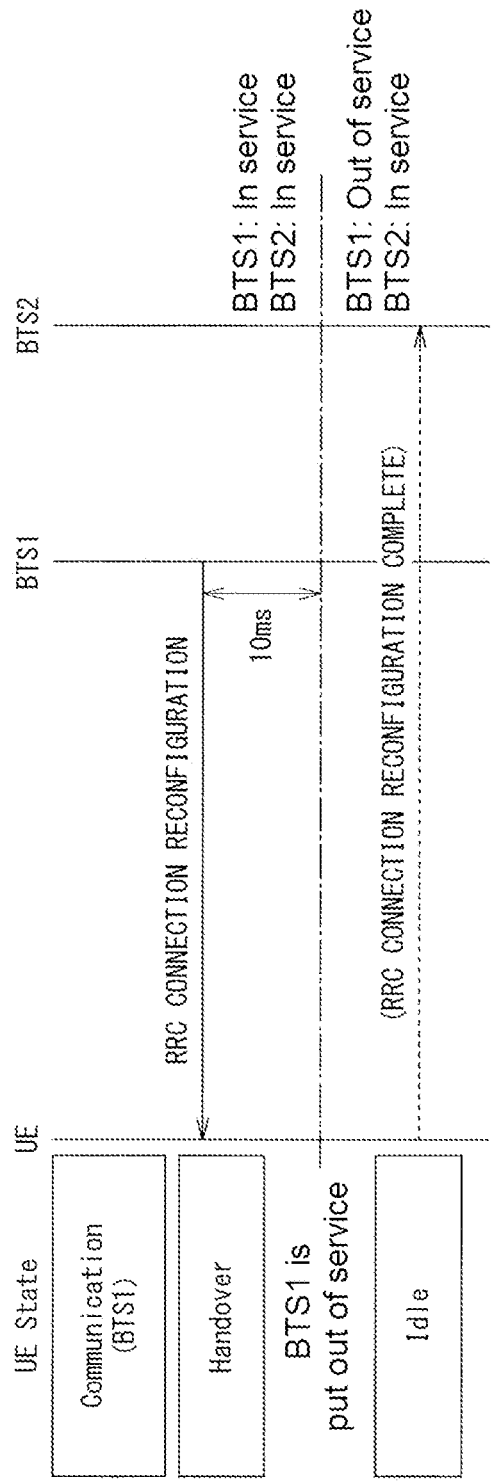
FIG. 6 is a sequence diagram showing a second operation example of the mobile terminal testing apparatus according to the embodiment of the present invention.

FIG. 6 shows, as a second operation example, a case where the state (UE State) of the mobile terminal 2, on which the out-of-service test is executed, is "Handover", a message to execute the out-of-service test is "RRC CONNECTION RECONFIGURATION", a base station that transmits the message is "BTS1", a waiting time until a base station is put out of service is "10 ms", and a base station that is put out of service is "BTS1".

As shown in FIG. 6, in a case where RRC CONNECTION RECONFIGURATION is transmitted from BTS1, UE State becomes Handover, and BTS1 is put out of service after waiting for 10 ms. UE State becomes Idle since connected BTS1 is put out of service.

Figure 7:
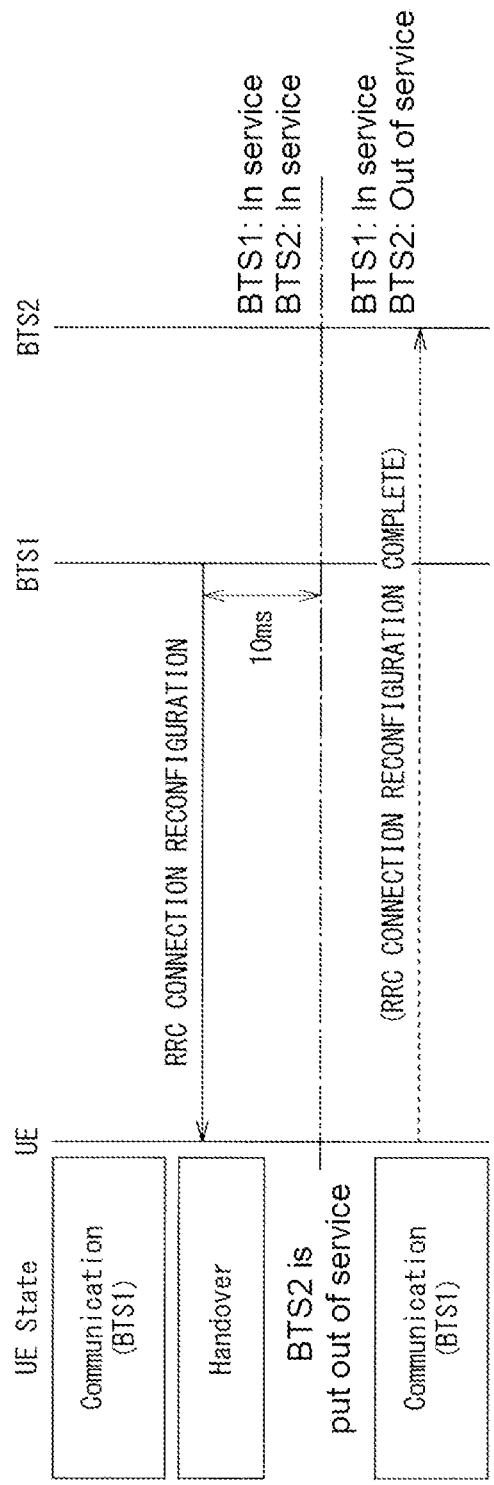
FIG. 7 is a sequence diagram showing a third operation example of the mobile terminal testing apparatus according to the embodiment of the present invention.

FIG. 7 shows, as a third operation example, a case where the state (UE State) of the mobile terminal 2, on which the out-of-service test is executed, is "Handover", a message to execute the out-of-service test is "RRC CONNECTION RECONFIGURATION", a base station that transmits the message is "BTS1", a waiting time until a base station is put out of service is "10 ms", and a base station that is put out of service is "BTS2".

As shown in FIG. 7, in a case where RRC CONNECTION RECONFIGURATION is transmitted from BTS1, UE State becomes Handover, and BTS2 is put out of service after waiting for 10 ms. UE State is not designated since base stations other than connected BTS1 are put out of service.

Figure 8:
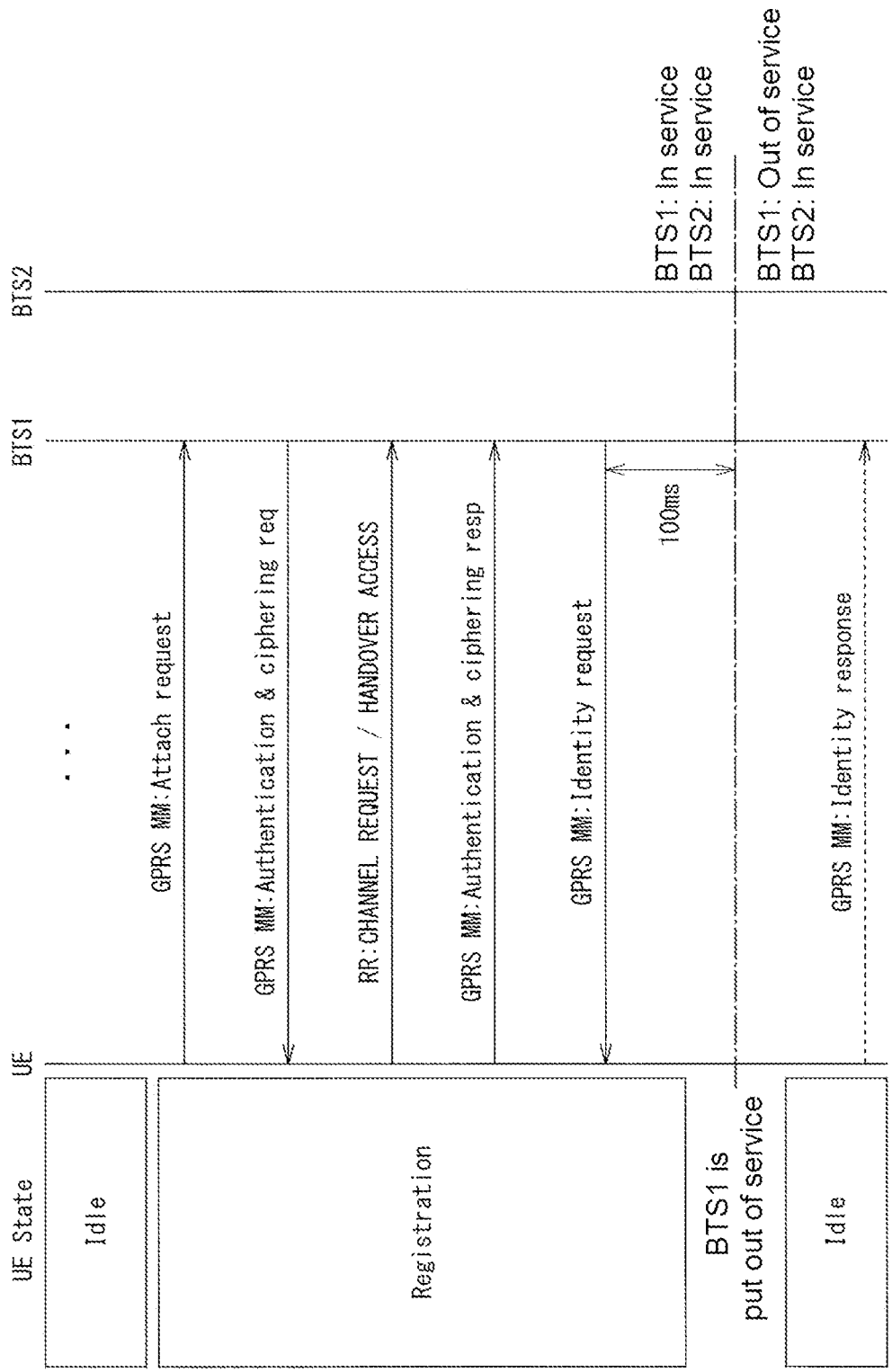
FIG. 8 is a sequence diagram showing a fourth operation example of the mobile terminal testing apparatus according to the embodiment of the present invention.

FIG. 8 shows, as a fourth operation example, a case where the state (UE State) of the mobile terminal 2, on which the out-of-service test is executed, is "Registration", a message to execute the out-of-service test is "GPRS NM: Identity request", a base station that transmits the message is "BTS1", a waiting time until a base station is put out of service is "100 ms", and a base station that is put out of service is "BTS1".

As shown in FIG. 8, in a case where a sequence of position registration is started from the mobile terminal 2, UE State becomes Registration, and GPRS MM: Identity request is transmitted from the BTS1, BTS1 is put out of service after waiting for 100 ms. UE State becomes Idle since connected BTS1 is put out of service.

Figure 9:
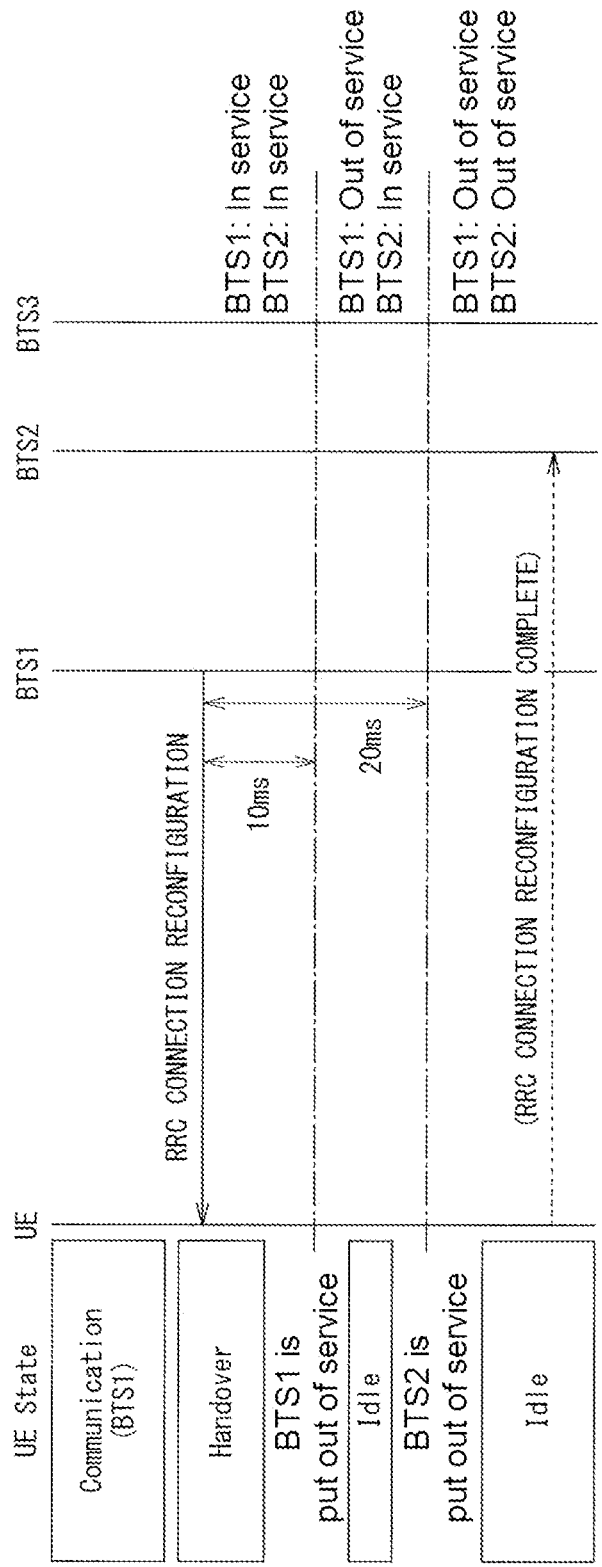
FIG. 9 is a sequence diagram showing a fifth operation example of the mobile terminal testing apparatus according to the embodiment of the present invention.

FIG. 9 shows, as a fifth operation example, a case where a plurality of base stations are put out of service by the same message. In this case, a first setting is that the state (UE State) of the mobile terminal 2, on which the out-of-service test is executed, is "Handover", a message to execute the out-of-service test is "RRC CONNECTION RECONFIGURATION", a base station that transmits the message is "BTS1", a waiting time until a base station is put out of service is "10 ms", and a base station that is put out of service is "BTS1", and a second setting is that the state (UE State) of the mobile terminal 2, on which the out-of-service test is executed, is "Handover", a message to execute the out-of-service test is "RRC CONNECTION RECONFIGURATION", a base station that transmits the message is "BTS1", a waiting time until a base station is put out of service is "20 ms", and a base station that is put out of service is "BTS2".

As shown in FIG. 9, in a case where RRC CONNECTION RECONFIGURATION is transmitted from BTS1, UE State becomes Handover, BTS1 is put out of service after waiting for 10 ms, and BTS2 is put out of service after waiting for 20 ms. UE State becomes Idle since connected BTS1 is put out of service.

In this way, in the above-described embodiment, in a case where the set message is transmitted from the set pseudo base station units 18-1, 18-2, and 18-3, the set pseudo base station units 18-1, 18-2, and 18-3 are put out of service.

With this, it is possible to execute a test for putting any pseudo base station unit 18-1, 18-2, and 18-3 out of service during state transition, such as during handover or during position registration.

In a case where the set message is transmitted from the set pseudo base station units 18-1, 18-2, and 18-3, the set pseudo base station units 18-1, 18-2, and 18-3 are put out of service after waiting for the set time.

With this, it is possible to increase states of an executable test by adjusting the timing at which the pseudo base stations are put out of service.

In a case where the set message is transmitted from the set pseudo base station units 18-1, 18-2, and 18-3, a plurality of pseudo base station units 18-1, 18-2, and 18-3 are put out of service after waiting for the set time, respectively.

With this, it is possible to increase states of an executable test by changing the timings at which the plurality of pseudo base station units 18-1, 18-2, and 18-3 are put out of service.

Although the embodiment of the present invention has been disclosed, it will be apparent to those skilled in the art that changes may be made without departing from the scope of the invention. All of such modifications and equivalents are intended to be included in the following claims.

DESCRIPTION OF REFERENCE NUMERALS AND SIGNS 1 mobile terminal testing apparatus
2 mobile terminal
14 control unit
17 scenario processing unit
18-1 pseudo base station unit
18-2 pseudo base station unit
18-3 pseudo base station unit
101 setting list display portion
102 setting content display portion
103 execution setting portion
104 target message setting portion
105 operation setting portion
106 edit button
107 out-of-service base station setting portion
108 timer setting portion
111 state setting portion
112 transmission base station setting portion
113 message selection portion
114 message display portion

What is claimed is:

1. A mobile terminal testing apparatus that simulates a plurality of base stations of mobile communication to test a mobile terminal, the mobile terminal testing apparatus comprising:
   a plurality of pseudo base station units that simulate the base stations; and
   a scenario processing unit that controls the pseudo base station units in compliance with a set scenario to execute a test,
   wherein the scenario processing unit puts at least one pseudo base station unit, which is set as a base station executing an out-of-service test, out of service in a case where a message set as a message to execute the out-of-service test is transmitted from one pseudo base station unit set as a base station transmitting the message to execute the out-of-service test.

2. The mobile terminal testing apparatus according to claim 1,
   wherein the scenario processing unit puts the at least one pseudo base station unit set as the base station executing the out-of-service test out of service after a set time elapses in a case where the message set as the message to execute the out-of-service test is transmitted from the one pseudo base station unit set as the base station transmitting the message to execute the out-of-service test.

3. The mobile terminal testing apparatus according to claim 2,
   wherein the scenario processing unit puts a plurality of the pseudo base station units set as the base station executing the out-of-service test cut of service after the set time elapses, respectively, in a case where the message set as the message to execute the out-of-service test is transmitted from the one pseudo base station unit set as the base station transmitting the message to execute the out-of-service test.

4. A method of controlling an out-of-service test of a mobile terminal testing apparatus that includes a plurality of pseudo base station units simulating a plurality of base stations of mobile communication and simulates the base stations to test a mobile terminal, the method comprising:
   a step of determining whether or not a message set as a message to execute the out-of-service test is transmitted from one pseudo base station unit set as a base station transmitting the message to execute the out-of-service test; and a step of putting at least one pseudo base station unit set as a base station executing the out-of-service test out of service in a case where the message set as a message to execute the out-of-service test is transmitted from the pseudo base station unit set as the base station transmitting the message to execute the out-of-service test.

5. The method according to claim 4, wherein the step of putting the at least one pseudo base station unit set as the base station executing the out-of-service test out of service is a step of putting the at least one pseudo base station unit set as the base station executing the out-of-service test out of service after a set time elapses in a case where the message set as the message to execute the out-of-service test is transmitted from the one pseudo base station unit set as the base station transmitting the message to execute the out-of-service test.

6. The method according to claim 5, wherein the step of putting the at least one pseudo base station unit set as the base station executing the out-of-service test out of service is a step of putting a plurality of the pseudo base station units set as the base station executing the out-of-service test out of service after the set time elapses, respectively, in a case where the message set as the message to execute the out-of-service test is transmitted from the one pseudo base station unit set as the base station transmitting the message to execute the out-of-service test.

* * * * *